United States Patent
Holzer et al.

(10) Patent No.: US 10,353,946 B2
(45) Date of Patent: Jul. 16, 2019

(54) CLIENT-SERVER COMMUNICATION FOR LIVE SEARCH USING MULTI-VIEW DIGITAL MEDIA REPRESENTATIONS

(71) Applicant: Fyusion, Inc., San Francisco, CA (US)

(72) Inventors: Stefan Johannes Josef Holzer, San Mateo, CA (US); Abhishek Kar, Berkeley, CA (US); Pantelis Kalogiros, San Francisco, CA (US); Ioannis Spanos, Larisa (GR); Luke Parham, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 201 days.

(21) Appl. No.: 15/409,497

(22) Filed: Jan. 18, 2017

(65) Prior Publication Data

US 2018/0203880 A1 Jul. 19, 2018

(51) Int. Cl.
*G06F 16/00* (2019.01)
*G06F 16/532* (2019.01)
*G06F 16/583* (2019.01)
*G06F 16/58* (2019.01)
(Continued)

(52) U.S. Cl.
CPC .......... *G06F 16/532* (2019.01); *G06F 16/583* (2019.01); *G06F 16/5866* (2019.01); *G06K 9/00664* (2013.01); *G06K 9/00979* (2013.01); *G06K 9/22* (2013.01)

(58) Field of Classification Search
CPC combination set(s) only.
See application file for complete search history.

(56) References Cited

U.S. PATENT DOCUMENTS 5,926,190 A  7/1999 Turkowski et al.
6,252,974 B1 6/2001 Martens et al.
(Continued)

OTHER PUBLICATIONS

Van Schaik, Paul, and Jonathan Ling. "The effects of frame layout and differential background contrast on visual search performance in web pages." Interacting with Computers 13, No. 5 (2001): 513-525. (Year: 2001).*

*Primary Examiner* — Farhan M Syed
(74) *Attorney, Agent, or Firm* — Kwan & Olynick LLP

(57) ABSTRACT

Provided are mechanisms and processes for performing live search using multi-view digital media representations. In one example, a process includes receiving a visual search query from a device for an object to be searched, where the visual search query includes a first set of viewpoints of the object obtained during capture of a first surround view of the object during a live search session. Next, additional recommended viewpoints of the object are identified for the device to capture, where the additional recommended viewpoints are chosen to provide more information about the object. A first set of search results based on the first set of viewpoints and additional recommended viewpoints of the object are transmitted to the device. In response, a second set of viewpoints of the object captured using image capture capabilities of the device are received. A second set of search results with enhanced matches for the object based on the first and second sets of viewpoints are then transmitted to the device. This process may continue iteratively until a desired set of search results is obtained.

20 Claims, 8 Drawing Sheets

(51) Int. Cl.
  *G06K 9/00*      (2006.01)
  *G06K 9/22*      (2006.01)

(56)         References Cited

U.S. PATENT DOCUMENTS

| | | | |
|---|---|---|---|
| 6,597,380 B1* | 7/2003 | Wang | G06T 15/20 |
| | | | 715/744 |
| 8,078,004 B2 | 12/2011 | Kang et al. | |
| 9,524,278 B2* | 12/2016 | Bargagni | G06F 16/00 |
| 10,015,551 B2* | 7/2018 | Sugio | H04N 21/4756 |
| 10,237,543 B2* | 3/2019 | Kim | H04N 13/376 |
| 2002/0094125 A1 | 7/2002 | Guo | |
| 2006/0188147 A1 | 8/2006 | Rai et al. | |
| 2008/0106593 A1 | 5/2008 | Arfvidsson et al. | |
| 2008/0152258 A1 | 6/2008 | Tulkki | |
| 2008/0201734 A1 | 8/2008 | Lyon et al. | |
| 2008/0225132 A1 | 9/2008 | Inaguma | |
| 2008/0246759 A1 | 10/2008 | Summers | |
| 2009/0263045 A1 | 10/2009 | Szeliski et al. | |
| 2009/0303343 A1 | 12/2009 | Drimbarean et al. | |
| 2010/0033553 A1 | 2/2010 | Levy | |
| 2010/0171691 A1 | 7/2010 | Cook et al. | |
| 2011/0102423 A1* | 5/2011 | Nam | H04N 13/305 |
| | | | 345/419 |
| 2011/0254835 A1 | 10/2011 | Segal | |
| 2011/0261050 A1 | 10/2011 | Smolic et al. | |
| 2012/0019557 A1 | 1/2012 | Aronsson et al. | |
| 2012/0147224 A1 | 6/2012 | Takayama | |
| 2012/0188341 A1* | 7/2012 | Klein Gunnewiek | |
| | | | H04N 13/161 |
| | | | 348/43 |
| 2013/0081087 A1* | 3/2013 | Lee | H04N 21/236 |
| | | | 725/54 |
| 2013/0155180 A1 | 6/2013 | Wantland et al. | |
| 2013/0162634 A1 | 6/2013 | Baik | |
| 2013/0250045 A1 | 9/2013 | Ki et al. | |
| 2013/0291025 A1* | 10/2013 | Ozawa | H04N 21/6587 |
| | | | 725/61 |
| 2014/0071251 A1* | 3/2014 | Nakamura | G06F 3/0346 |
| | | | 348/51 |
| 2014/0087877 A1 | 3/2014 | Krishnan | |
| 2014/0222783 A1* | 8/2014 | Chang | G06K 9/00671 |
| | | | 707/722 |
| 2014/0253436 A1 | 9/2014 | Petersen | |
| 2014/0307045 A1 | 10/2014 | Richardt et al. | |
| 2015/0023430 A1* | 1/2015 | Choi | H04N 19/597 |
| | | | 375/240.25 |
| 2015/0029317 A1* | 1/2015 | Kim | H04N 13/376 |
| | | | 348/59 |
| 2015/0130799 A1* | 5/2015 | Holzer | G06F 16/532 |
| | | | 345/420 |
| 2015/0130800 A1* | 5/2015 | Holzer | G06F 16/532 |
| | | | 345/420 |
| 2015/0130894 A1* | 5/2015 | Holzer | G06F 16/532 |
| | | | 348/36 |
| 2015/0134651 A1* | 5/2015 | Holzer | G06F 16/532 |
| | | | 707/723 |
| 2015/0138190 A1* | 5/2015 | Holzer | G06F 16/532 |
| | | | 345/419 |
| 2015/0339846 A1* | 11/2015 | Holzer | G06F 16/532 |
| | | | 345/419 |
| 2016/0162454 A1* | 6/2016 | Bargagni | G06F 16/00 |
| | | | 715/745 |
| 2016/0192009 A1* | 6/2016 | Sugio | H04N 21/4756 |
| | | | 725/32 |
| 2017/0018054 A1 | 1/2017 | Holzer et al. | |
| 2017/0018055 A1 | 1/2017 | Holzer et al. | |
| 2017/0018056 A1 | 1/2017 | Holzer et al. | |
| 2017/0084001 A1 | 3/2017 | Holzer et al. | |
| 2018/0035134 A1* | 2/2018 | Pang | H04N 19/597 |
| 2018/0089903 A1* | 3/2018 | Pang | H04N 19/33 |
| 2018/0097867 A1* | 4/2018 | Pang | H04N 5/2226 |
| 2018/0288485 A1* | 10/2018 | Sugio | H04N 21/4756 |

* cited by examiner

CLIENT-SERVER COMMUNICATION FOR LIVE SEARCH USING MULTI-VIEW DIGITAL MEDIA REPRESENTATIONS

TECHNICAL FIELD

The present disclosure relates to live search in which a multi-view interactive digital media representation is used in a search query.

DESCRIPTION OF RELATED ART

Online searching is commonly used to find information or objects by entering a textual search query. For instance, a word, phrase, or question can be used to find information about an object by name. Search results can include descriptions, pictures, videos, etc.

However, when someone is searching for a particular object, such as a pair of shoes or a toy, the user must know what search terms to enter. If the user has the object in hand but does not know what the item is called, the user may have difficulty searching for the object. For instance, the user may want to identify the object and information about it, such as with a vintage toy or pair of shoes. The user may also want to search for the item's availability, especially if the user wants to purchase the item again or if the user wants to research the value of the item for resale.

Accordingly, it is desirable to develop improved mechanisms and processes relating to searching for objects. Such improved mechanisms and processes can facilitate search in an efficient manner without requiring the user to know anything about the object. More specifically, improved mechanisms that allow users to search using visual data are desirable.

OVERVIEW

Provided are various mechanisms and processes relating to performing live search using multi-view digital media representations.

In one aspect, which may include at least a portion of the subject matter of any of the preceding and/or following examples and aspects, a process includes receiving a visual search query from a device for an object to be searched, where the visual search query includes a first set of viewpoints of the object obtained during capture of a first surround view of the object during a live search session. Next, additional recommended viewpoints of the object are identified for the device to capture, where the additional recommended viewpoints are chosen to provide more information about the object. A first set of search results based on the first set of viewpoints and additional recommended viewpoints of the object are transmitted to the device. In response, a second set of viewpoints of the object captured using image capture capabilities of the device are received. A second set of search results with enhanced matches for the object based on the first and second sets of viewpoints are then transmitted to the device. This process can continue iteratively until a desired set of search results is obtained.

In another aspect, which may include at least a portion of the subject matter of any of the preceding and/or following examples and aspects, a system includes a live search interface and live search front end server. The live search interface is configured to receive viewpoints of an object to be searched from a device, where the viewpoints are obtained in real-time using image capture capabilities of the device during a live search session. The live search interface is further configured to transmit search results that include matches for the object based on the viewpoints received. In addition, the live search interface is configured to transmit additional recommended viewpoints that would yield enhanced matches for the object if provided by the device. The live search front end server is configured to identify the additional recommended viewpoints of the object for the device to capture, where the additional recommended viewpoints are chosen based on the viewpoints received from the device and where the additional recommended viewpoints are chosen to provide more distinguishing information about the object that would improve the accuracy of the search results.

In yet another aspect, which may include at least a portion of the subject matter of any of the preceding and/or following examples and aspects, a computer readable medium includes computer code for receiving a visual search query from a device for an object to be searched, where the visual search query includes a first set of viewpoints of the object obtained during capture of a first surround view of the object during a live search session. The computer readable medium also includes computer code for identifying additional recommended viewpoints of the object for the device to capture, where the additional recommended viewpoints are chosen to provide more information about the object. The computer readable medium further includes computer code for transmitting a first set of search results based on the first set of viewpoints and additional recommended viewpoints of the object to the device. The computer readable medium includes computer code for receiving a second set of viewpoints of the object captured using image capture capabilities of the device and transmitting a second set of search results with enhanced matches for the object based on the first and second sets of viewpoints to the device. The computer readable medium can further include computer code for iteratively providing additional recommended viewpoints and generating search results for viewpoints received from the device until a desired set of search results is obtained.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
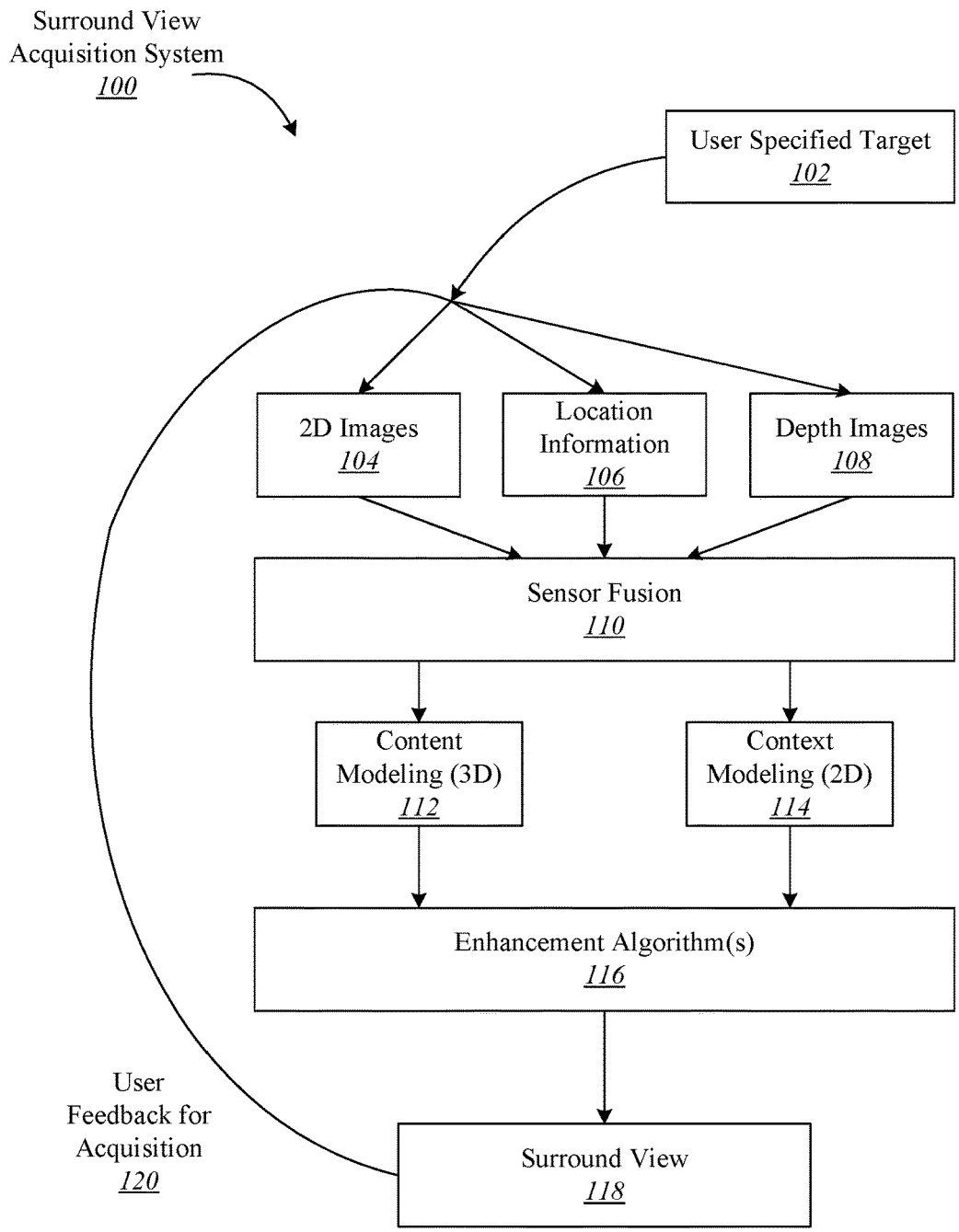
FIG. 1 illustrates an example of a surround view acquisition system.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to various embodiments, improved mechanisms and processes are described for facilitating live visual search. Such improved mechanisms and processes allow a user to search for an object in an efficient manner by using a multi-view digital media representation as a search query. The search query is then used to find search results for visual matches. In various embodiments, the user captures images of the object from multiple views, and may be prompted for additional views in order to enhance the accuracy of the search results.

In particular embodiments, an iterative search process is provided through a client-server communication system. During this iterative search process, the user gets direct feedback regarding search results while recording images from a capture device, such as a smartphone, camera, etc. In one example, the system guides the user during the recording process and requests additional information to help obtain more accurate search results. The user can continue recording until the search results are satisfactory. This iterative search process can also be called a live search when it is performed in real-time during a session using images captured by live recording. During a live search, the results are directly presented to the user in real-time as the images are provided to the system. In particular, live search results are updated while the user moves the capture device.

The mechanisms and processes described in this disclosure provide improvements over previous visual searching capabilities that use a single image as a search query. Although visual search using a single image as a search query enables a user to look for information about items similar to an object depicted, such searching capabilities are limited by the information visible in that single image. Because a single image provides limited information about an object, using a single image as a search query often fails to yield accurate results. By using a multi-view digital media representation in a search query, as described in various embodiments herein, significantly more information is available that can yield significantly better and more relevant search results.

With reference to FIG. 1, shown is an example of a surround view acquisition system that can be used to generate a multi-view interactive digital media representation that can be used in a visual search query. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 100 is depicted in a flow sequence that can be used to generate a surround view. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110.

Various combinations of image data can be used with location information at 106, depending on the application and available data.

In the present example embodiment, the data that has been fused together at sensor fusion block 110 is then used for content modeling 112 and context modeling 114. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in visual search.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

Figure 2:
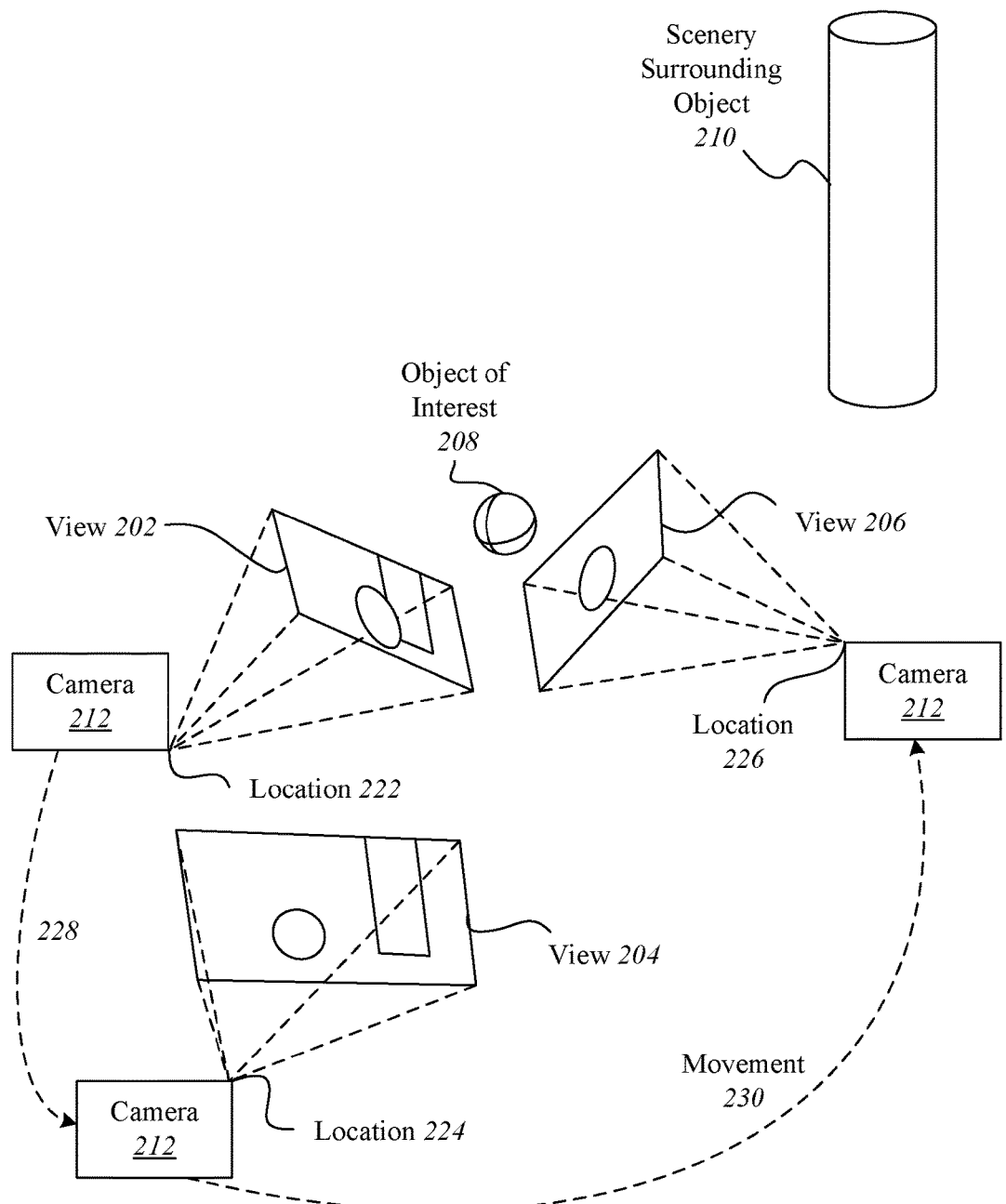
FIG. 2 illustrates an example of a device capturing multiple views of an object of interest from different locations during a search session.

With reference to FIG. 2, shown is an example of a device capturing multiple views of an object of interest from different locations during a live search session. The capture device is indicated as camera 212, and moves from location 222 to location 224 and from location 224 to location 226. The multiple camera views 202, 204, and 206 captured by camera 211 can be fused together into a three-dimensional (3D) model. According to various embodiments, multiple images can be captured from various viewpoints and fused together to provide a multi-view digital media representation.

In the present example embodiment, camera 212 moves to locations 222, 224, and 226, respectively, along paths 228 and 230, in proximity to an object of interest 208. Scenery can surround the object of interest 208 such as object 210. Views 202, 204, and 206 are captured by camera 212 from locations 222, 224, and 226 and include overlapping subject matter. Specifically, each view 202, 204, and 206 includes the object of interest 208 and varying degrees of visibility of the scenery surrounding the object 210. For instance, view 202 includes a view of the object of interest 208 in front of the cylinder that is part of the scenery surrounding the object 208. View 204 shows the object of interest 208 to one side of the cylinder, and view 206 shows the object of interest without any view of the cylinder.

In the present example embodiment, the various views 202, 204, and 206 along with their associated locations 222, 224, and 226, respectively, provide a rich source of information about object of interest 208 and the surrounding context that can be used to produce a multi-view digital media representation, such as a surround view. For instance, when analyzed together, the various views 202, 204, and 206 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 208 into content and the scenery 210 as the context. In particular examples, the content can then be used as part of a visual search query.

Figure 3:
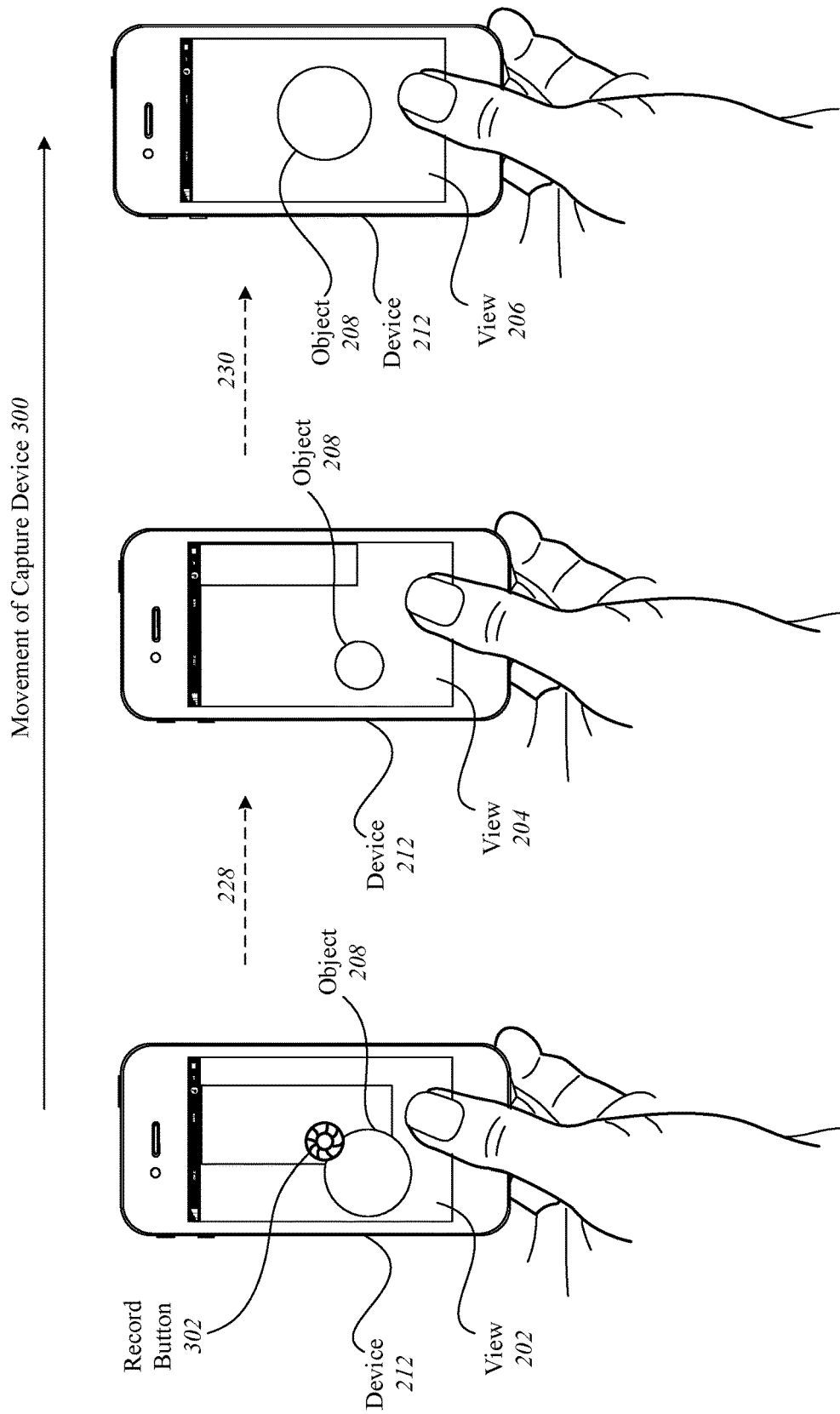
FIG. 3 illustrates an example of a device capturing views of an object of interest during a search session.

With reference to FIG. 3, shown is an example of a device capturing views of an object of interest during a search session. During the search session, multiple views of the object 208 are captured by the device 212 from different locations. In the present example, data is acquired when a user taps a record button 302 on capture device 212 to begin recording images of the object.

The user moves 300 the capture device 212 from location 222 to location 224 along path 228 and from location 224 to location 226 along path 230. As described in more detail below with regard to FIGS. 5-7, search results can be provided in real-time at the device 212, and prompts for the user to capture particular views can be provided during the session. In particular, the system can prompt the user to move the device 212 in a particular direction or may prompt the user to provide additional information. As the user records different views of the object, search results are reiteratively refined to provide increasingly accurate results. Once the user is satisfied with the search results, the user may choose to stop recording by tapping the record button 302 again. In other examples, the user can tap and hold the record button during the session, and release to stop recording. In the present embodiment, the recording captures a series of images that can be used to generate a multi-view digital media representation that can be used as a visual search query to produce dynamic search results during the session.

Figure 4:
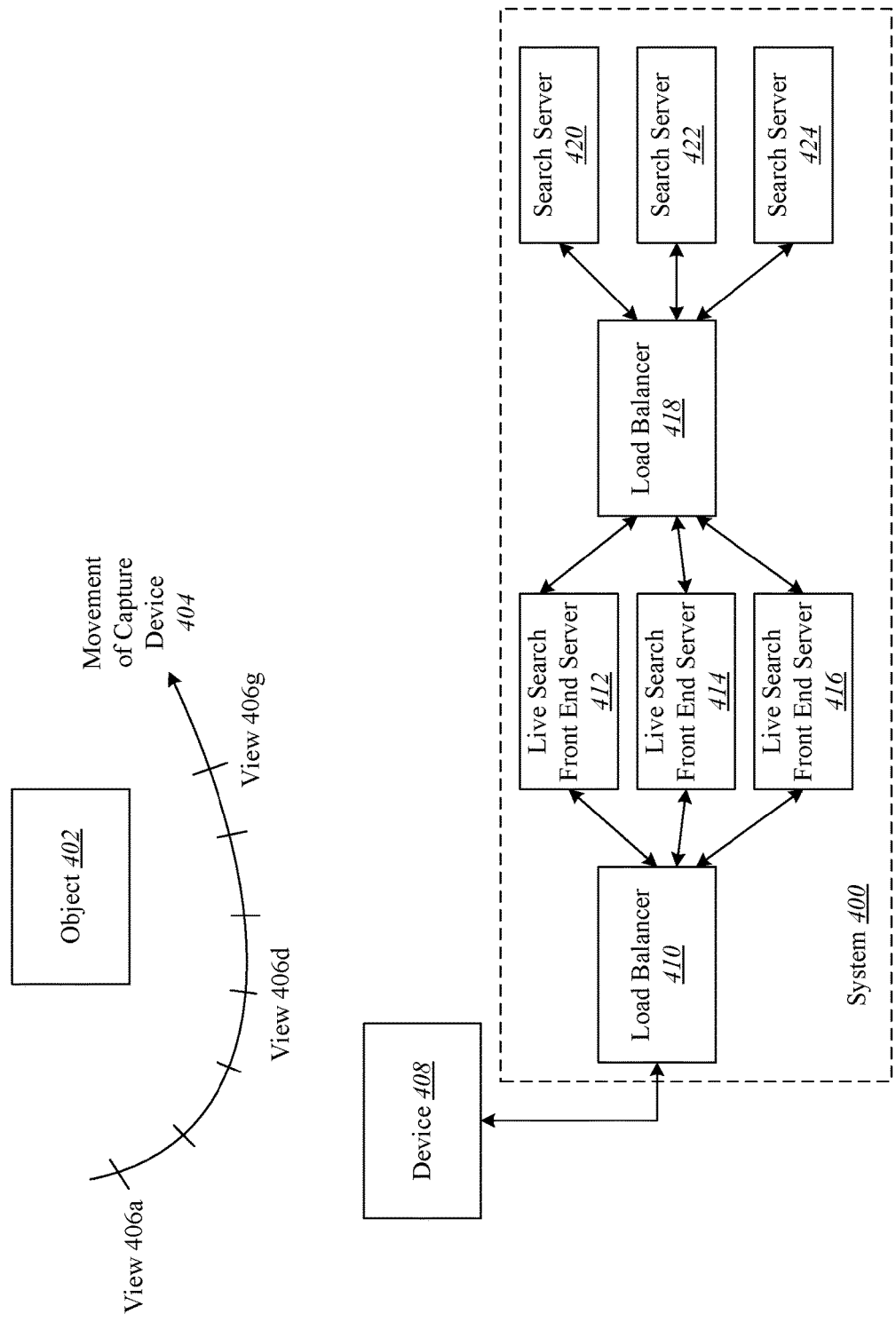
FIG. 4 illustrates one example of a system that can be used to perform a live search using multi-view digital media representations.

With reference to FIG. 4, shown is one example of a system that can be used to perform a live search using multi-view digital media representations. As depicted, a combination of client and server applications is used to implement a visual search mechanism that runs live in a capture device application, such as with a camera on a smartphone. While the camera is recording, the user points the camera at an object to be searched. The user then moves around the object to capture multiple viewpoints and receives live search results that are refined as more viewpoints are captured.

In the present embodiment, the client is depicted as device 408, which can be a capture device such as a digital camera, smartphone, mobile device, etc. The server is depicted as system 400, which receives images of the object to be searched and generates search results based on the multi-view digital media representation of the object. In particular, the live search front end servers 412, 414, and 416 can be used for operations such as determining additional views and/or information that may be helpful in refining the search results, calculating confidence values, and communicating with device 408. The search servers 420, 422, 424 can be used for operations such as those relating to searching for and retrieving search results. Although system 400 includes load balancers 410 and 418 to improve performance of the system and make the system scalable, these load balancers 410 and 418 are optional in some implementations.

According to various embodiments, device 408 captures images of object 402 to generate a multi-view digital media representation that can be used in a live search query for the object. In particular, device 408 follows a path depicted as movement of capture device 404 while recording images of object 402 from views 406a to 406g. The views 406a to 406g are captured as images or frames, which belong to the same session. In some examples, a session ID is returned together with the first search result and then sent to server with every new frame captured. From the capture device 408, each frame is uploaded, along with any additional information such as location information, etc.

In one example, the session begins by initially sending a frame, set of frames, or a multi-view digital media representation with a very limited number of frames, captured by device 408 to system 400 as a query for a first search result. Other information associated with the frame(s), such as data collected by sensors (e.g. IMU data, GPS location, audio etc.), may also be sent with the frames in some implementations. The system 400 uses the frame(s) and any associated information to perform an initial search query and return search results to the user with a unique identifier that allows the session to extend across multiple iterations by allowing additional data to be included in subsequent queries. During the search session, more data is sent with the unique identifier to expand coverage of the multi-view capture. System 400 uses the additional data to improve the search results by combining the additional data with the previously received multi-view data as a query. During the session, the system 400 is iteratively sends search results to device 408, such that the user receives updated search results as more information is provided from device 408. In the present example, system 400 provides an indication to the user whether more data is necessary or not to provide improved search results. For instance, the server can optionally provide confidence values for the search results, which can be used by the user as guidance regarding the accuracy of the search results and whether the user should provide additional data to improve the search results.

According to various embodiments, system 400 also provides information to device 408 about which additional viewpoints would be helpful to improve the search results. In particular examples, the device 408 can use this information to provide the user with directions about how device 408 should be moved to capture these additional viewpoints. Specifically, these requests for additional views can include movement of the camera and/or position/orientation change of the object (e.g. turn the object upside down). In yet other examples, system 400 may also request additional information such as a visual, oral, or textual question through device 408. This request may also include input such as selection via touchscreen or selection of a particular portion of the image. This additional information can be used to narrow the focus of the search performed by system 400.

Figure 5:
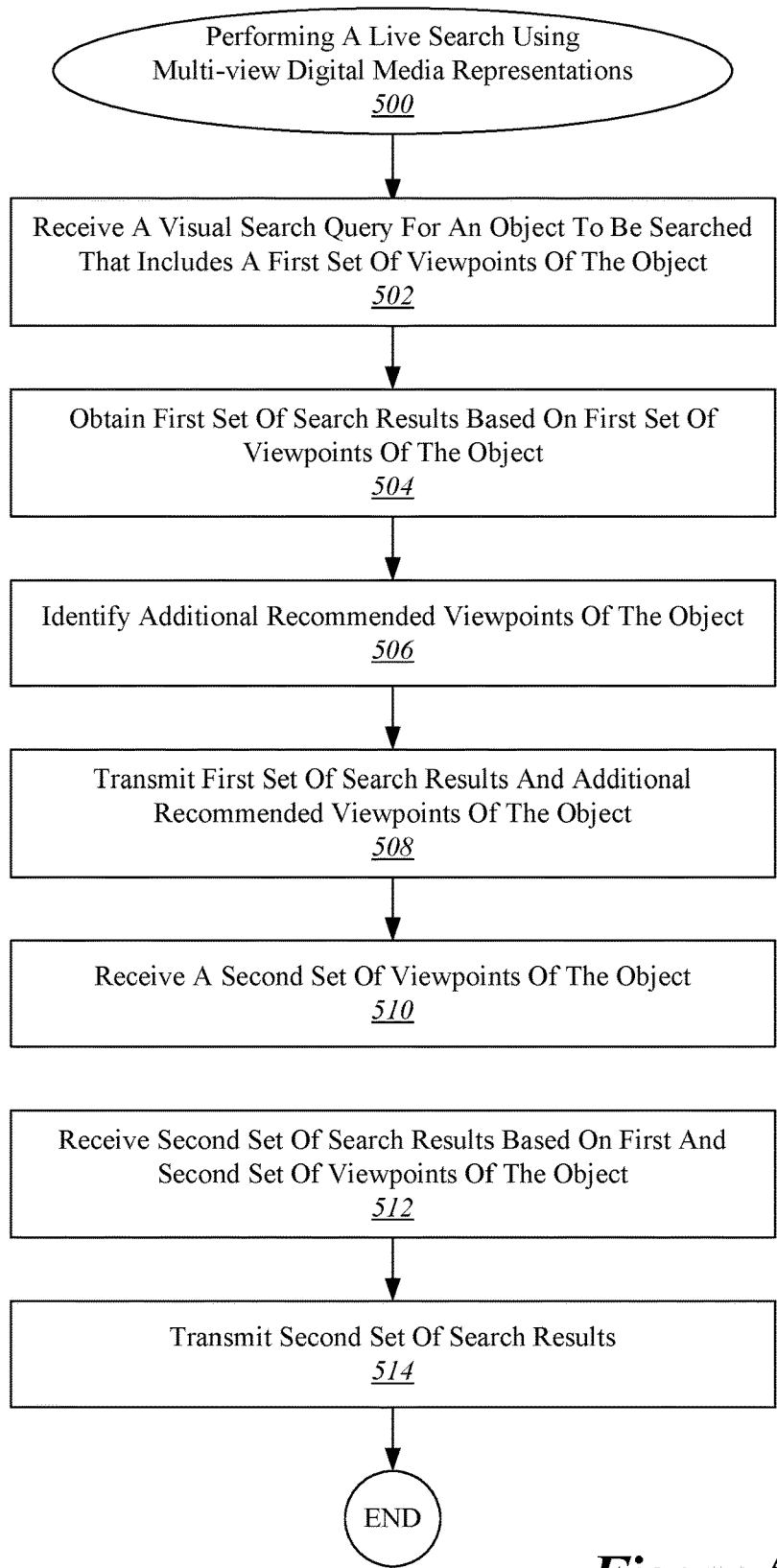
FIG. 5 illustrates one example of a process for performing a live search using multi-view digital media representations.

With reference to FIG. 5, shown is one example of a process for performing a live search using multi-view digital media representations in a search query. According to various embodiments, using a multi-view digital media representation can provide much higher discriminative power in search results than any other digital media representation to date. In particular, the ability to separate content and context in a surround view is an important aspect that can be used in visual search. Additional data sources such as location-based information, which are used to generate multi-view digital media representations, such as surround views, provide valuable information that improves the capability of visual recognition and search.

In particular example embodiments, two components of a surround view, the context and the content, both contribute significantly to the visual recognition process. Specifically, the separation of context and content allows the system to focus on the object of interest, which is identified as the content. In some examples, the context can also assist in determining characteristics of the object, such as relative scale, where the object may be used, etc. Additionally, separating out the object from the rest of the image allows the system to detect texture, color, and shape information about the object.

In the present example, a live search process 500 begins with the system receiving a visual search query for an object to be searched from a device at 502. The visual search query includes at first set viewpoints of the object. These viewpoints can be submitted as frames or images depicting the object of interest from different viewpoints. These multiple frames or images can be part of a multi-view digital media representation or surround view captured during the live search session. In some examples, additional information associated with the images such as inertial measurement unit (IMU) data obtained when capturing the images, location information, etc. may also be included with the first set of viewpoints.

Next, the system obtains a first set of search results based on the first set of viewpoints provided by the device at 504. As described in FIG. 4, search servers are used by the system to obtain search results based on the visual search query. In particular, images provided in the first set of viewpoints of the object are compared to stored images. In various examples, comparing the images provided in the first set of viewpoints to the stored images includes comparing the shape of the object to the stored images. In other examples, comparing the images provided in the first set of viewpoints to the stored images includes comparing the appearance of the object in the first set of viewpoints to the stored images. Furthermore, comparing the first set of viewpoints to the stored images can include comparing the texture of the object in the first set of viewpoints to the stored images. In some embodiments, comparing the images provided in the first set of viewpoints to the stored images includes comparing the context of the object to the stored images. In addition, because a multi-view digital media representation, such as a surround view, provides views from many sides of the object, distinctive views that are appropriate for search can be selected to use in comparisons to stored images. These distinctive views show aspects of the object that are not visible from other viewpoints. Furthermore, these distinctive views can be used to pare down possible matches that may be found based on other viewpoints provided of the object. Of course any of the criteria described for comparison can be used in conjunction with each other.

In the present example, a determination is made whether any stored images match the images provided in the first set of viewpoints. If any of the stored images are found to be matches, these matches are then included as search results. As mentioned previously, these matches can be pared down by selecting only search results that match multiple viewpoints of the object, including distinctive views.

Once the search results are found, the system then identifies additional recommended viewpoints for the device to capture of the object at 506. These additional recommended viewpoints are chosen to provide more information about the object. Although a single viewpoint may be ambiguous to adequately describe a three-dimensional object, multiple views of the object can provide more specific and detailed information. These multiple views can provide enough information to allow a visual search query to yield more accurate search results. The first set of viewpoints of the object may include views from many sides of an object, but distinctive views can be requested from a user if a distinctive view is not available. In particular, if there are distinctive views that show features not visible from other views, these views can be identified as additional recommended viewpoints. These additional recommended viewpoints would help distinguish the object from other similar objects. In some examples, these additional recommended viewpoints are identified at a server receiving the visual search query, such as a front end server like the ones depicted in FIG. 4.

In the present embodiment, if the data captured or otherwise provided in the first set of viewpoints is not sufficient to allow recognition or generation of the object of interest with a sufficiently high certainty, the system can suggest additional recommended views that can include guidance for the user to continue moving the capture device or provide additional image data. In some cases, if a surround view is determined to need additional views to produce a more accurate model of the object to be searched, the user may be prompted to provide additional images from various viewpoints.

According to various embodiments, suggestions to provide one or more additional recommended views can be determined based on the locations associated with the images already received in the first set of viewpoints. In addition, these additional recommended views can include suggesting using a particular capture mode such as a locally concave surround view, a locally convex surround view, or a locally flat surround view, depending on the information desired by the system. The additional recommended views can include location information, movement information, etc. Furthermore, additional recommended viewpoints can also be identified by indicating a direction in which the device should be moved by the user while recording images of the object during the live search session.

After the additional recommended viewpoints are identified, the first set of search results and additional recommended viewpoints are transmitted to the device at 508. The first set of search results include matches based on the first set of viewpoints provided by the device. In some examples, the search results can include a ranked list that displays thumbnails of the matching results. In other examples, links to retailers can be included with the thumbnails. Additionally, information about the matching results such as name, brand, price, sources, etc. can be included in some instances.

In the present embodiment, the additional recommended viewpoints are provided to further enhance the search results by including additional information not visible in the first set of viewpoints. During the session, the user can be asked to capture additional images from particular angles or locations. In some examples, the user may be asked to move the object relative to the camera. Additionally, in some implementations, the user can be prompted when a distinct viewing angle is detected while the user is recording images on the device. Specifically, once the user is instructed about how to capture the additional images, the device can provide a notification when the additional images have been captured successfully.

These additional images are then sent to the system as a second set of viewpoints of the object. As mentioned previously, a session ID can be provided with the second set of viewpoints to allow the system to combine this second set of viewpoints with the first set of viewpoints in the search process. In some examples, the second set of viewpoints will be used to refine or generate a surround view of the object.

At 510, the system receives the second set of viewpoints from the device. The second set of viewpoints is obtained by using image capture capabilities of the device during the session and includes at least one of the additional recommended viewpoints requested by the system. In some examples, even if no additional recommended viewpoints are provided, a revised search can be performed based on the second set of viewpoints received.

Next, the system receives a second set of search results based on the first and second sets of viewpoints provided by the device at 512. These search results can be obtained in various ways. In one example, images provided in the second set of viewpoints can be compared to the first set of search results to determine which of these search results still qualify as matches based on the additional information provided. In another example, the first set of viewpoints and second set of viewpoints are compared to stored images. In yet another example, a surround view or 3D model can be compared to the stored images. For instance, specific images from the surround view or 3D model of the object can be compared to the stored images. As previously described, comparing the images can include aspects such as considering the shape, appearance, texture, context, and/or distinctive views of the object. Of course any of the criteria described for comparison can be used in conjunction with each other. Any matches found based on the images provided in the first and second set of viewpoints are included as a second set of search results. The second set of search results is then transmitted to the device at 514. This second set of search results includes enhanced matches for the object based on the first and second set of viewpoints provided by the device.

Although the present embodiment depicts a live search process involving two sets of search results, it should be recognized that additional search results can be provided as additional viewpoints of the object are transmitted from the device to the system. Specifically, additional sets of search results can be provided in an iterative process based on additional recommended viewpoints identified by the server and additional viewpoints provided by the device. With each set of additional recommended viewpoints provided, the corresponding set of search results includes increasingly enhanced matches for the object.

Figure 6:
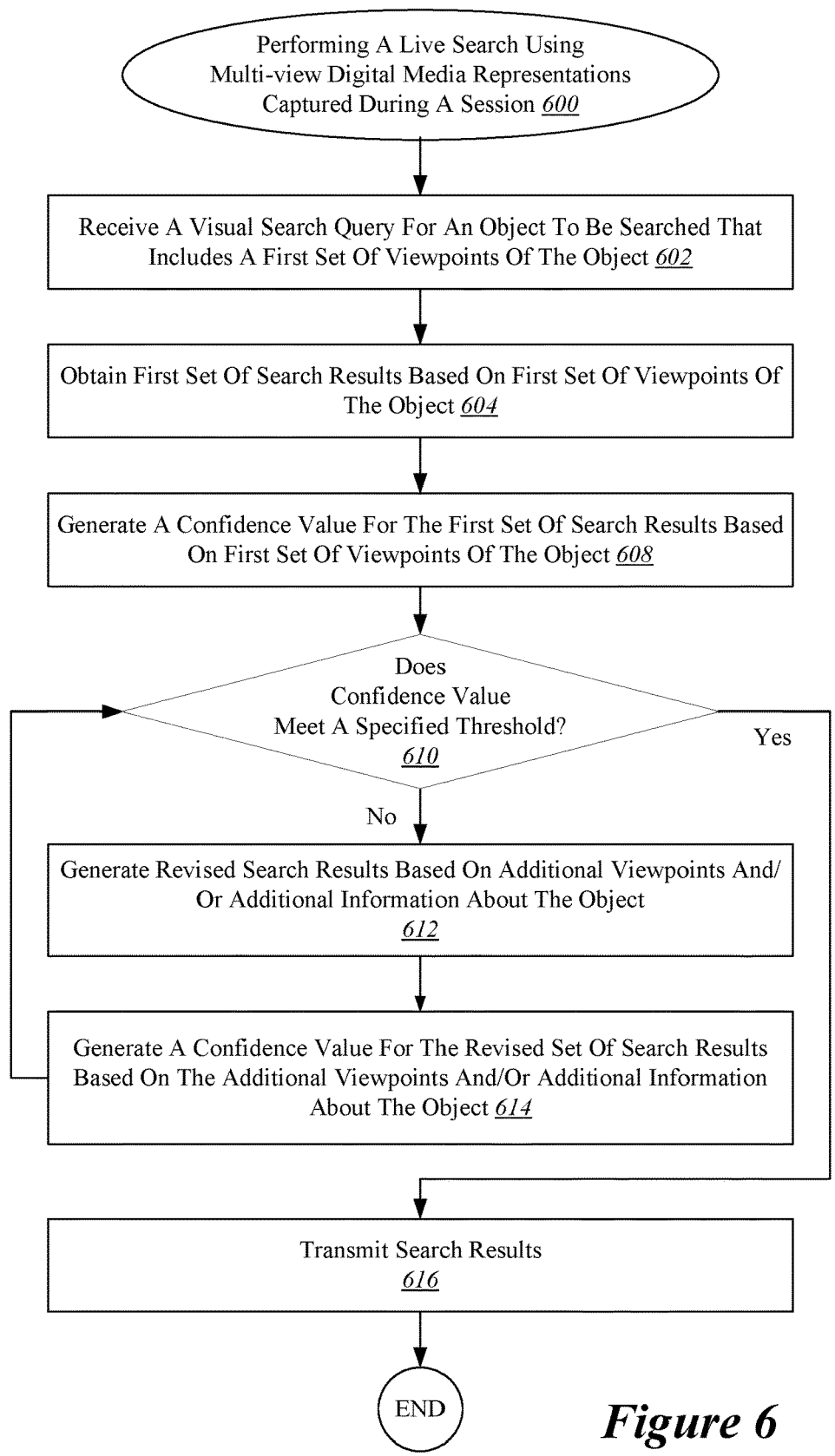
FIG. 6 illustrates another example of a process for performing a live search using multi-view digital media representations captured during a session.

With reference to FIG. 6, shown is another example of a process for performing a live search using multi-view digital media representations captured during a live session. This process is similar to the process described in FIG. 5, but also includes an iterative approach and generation of a confidence value that is used to determine if the current set of search results meets a specified threshold. Until the search results meet the specified threshold, the process continues by generating revised search results based on additional viewpoints and/or additional information about the object that are provided by the user.

In the present example, a live search process 600 begins with the system receiving a visual search query for an object to be searched from a device at 602. The visual search query includes at first set viewpoints of the object. These viewpoints can be submitted as frames or images depicting the object of interest from different viewpoints. These multiple frames or images can be part of a multi-view digital media representation or surround view captured during the live search session. In some examples, additional information associated with the images such as inertial measurement unit (IMU) data obtained when capturing the images, location information, etc. can be provided with the first set of viewpoints.

Next, the system obtains a first set of search results based on the first set of viewpoints provided by the device at 604. As described in FIG. 4, search servers can be used by the system to obtain search results based on the visual search query. In particular, images provided in the first set of viewpoints of the object are compared to stored images. As previously described, comparing the images can include aspects such as considering the shape, appearance, texture, context, and/or distinctive views of the object. Of course any of the criteria described for comparison can be used in conjunction with each other. Any matches found based on the images provided in the first set of viewpoints are included as a first set of search results.

Once the first set of search results is obtained, the system generates a first confidence value corresponding to the first set of search results at 608. This first confidence value indicates an estimation of how closely the first set of search results matches the object to be searched. Although not shown in the figure, the first set of search results along with the confidence value can be transmitted to the device in some examples. In these examples, the user can see search results during the session as they become available. In other examples, the first search results and confidence value can be kept within the system and only final search results meeting a specified confidence value can be transmitted to the user through the device.

In the present embodiment, a determination is made at 610 whether the confidence value meets a specified threshold. This specified threshold can be set in various ways depending on the way the system is implemented. One possibility is that there is a default specified threshold that is set without input from the user. Another possibility is that the user can set the specified threshold, such as by designating that if the number of search results exceeds a certain amount, then the threshold is not met. In this case, the high number of search results suggests that the matches have not been sufficiently filtered. Yet another possibility is that meeting the specified threshold includes receiving input from the user that the results are satisfactory. For instance, the confidence value and search results can be provided to the user via the device as a percentage that estimates how confident the system is that the search results accurately match the object along with a list of the search results found. The user can then indicate whether these search results are sufficient or whether the user would like to refine the search by providing additional viewpoints or information about the object.

According to various embodiments, if the confidence value meets the specified threshold at 610, then the search results can be transmitted to the device at 616. However, if the confidence value does not meet the specified threshold at 610, then the system generates revised search results based on additional viewpoints and/or additional information provided by the device about the object at 612. More specifically, this process of generating revised search results follows the process described below with regard to FIG. 7. Although not shown in the figure, the revised set of search results along with a corresponding confidence value can be transmitted to the device in some examples. In these examples, the user can see the revised search results during the session as they become available. In other examples, the revised search results and corresponding confidence value can be kept within the system and only final search results meeting a specified confidence value can be transmitted to the user through the device.

Once a revised set of search results is generated at 612, the system generates a confidence value for the revised set of search results. This confidence value indicates an estimation of how closely the revised search results match the object to be searched. If the confidence value meets the specified threshold at 610, then the revised search results can be transmitted to the device at 616. However, if the confidence value does not meet the specified threshold at 610, then process continues to iteratively generate revised search results based on additional viewpoints and/or additional information received from the device about the object at 612. This process continues until the confidence value of the revised set of search results meets the specified threshold. Once this occurs, the search results are transmitted to the device at 616 and the process ends.

In the present embodiment, the first set of viewpoints, additional viewpoints, and/or additional information about the object are associated with a single session. During this session, the images associated with the first set of viewpoints and additional recommended viewpoints are captured in real-time by a live camera associated with the device. As described previously, each set of viewpoints sent from the device can include a session ID that allows the system to add this data to the previously received data. Although recording by the camera can be continuous in some cases, recording can also be intermittent during a session in some instances. For instance, if the user wishes to see the current search results, the user may pause or stop recording until additional views are requested by the device. In addition, any additional information about the object, such as in the form of textual, oral, or touch input to the device is also associated with a single session. This information can also be sent with the session ID to allow this information to be included in revised search results.

Figure 7:
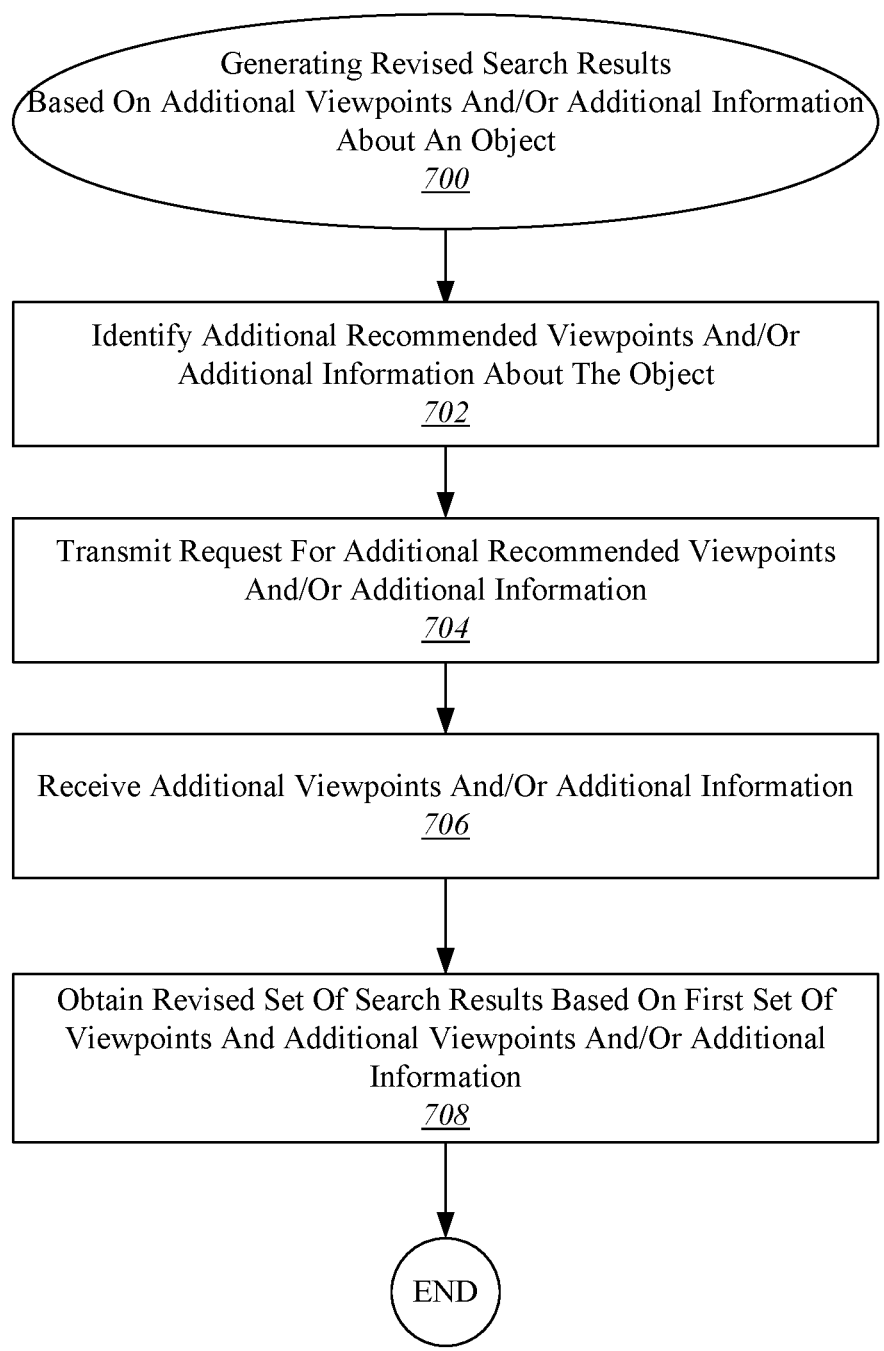
FIG. 7 illustrates one example of a process for generating revised search results based on additional recommended viewpoints and/or additional information about an object.

With reference to FIG. 7, shown is one example of a process for generating revised search results based on additional viewpoints and/or additional information received from the device about an object to be searched. This process 700 more fully describes the process described with regard to FIG. 6 at block 612. In particular, this process 700 can be inserted at block 612 to provide a more detailed process sequence.

In the present example, the process 700 begins with the system identifying additional recommended viewpoints and/or additional information about the object at 702. The additional recommended viewpoints are selected to provide additional information that would be useful for providing more relevant search results. Specifically, the additional recommended viewpoints may show aspects of the object that are not visible in the first set of viewpoints. These additional recommended viewpoints, if included in the search query, would refine the search results. The system can determine these additional recommended viewpoints based on aspects such as location of the camera relative to the object, orientation of the object relative to the camera, etc. In particular, the system can determine which additional viewpoints may be helpful based on the locations and/or other characteristics of the first set of viewpoints.

In some examples, the system may also request additional information from the user. The device can request this additional information from the user through an application on the device, such as by prompting the user in the form of visual, oral, and/or textual questions. For instance, a prompt can include a question about whether the object/scene of interest is part of a specific category (e.g. "Are you looking for a BMW?" or "Select the brand that fits your search:"). Additionally, the system may ask the user to enter touch input that can be used for better selection and segmentation of the object of interest. Specifically, prompts for such touch input can include requests such as: "Touch the object of interest", "Move the object of interest," "Position the object of interest in the center of the screen," "Point camera at the object of interest," "Touch the object of interest on the screen," and "Circle the object of interest." Other types of requests may include audio samples, etc. For example, a prompt can include a request for the user to "Tap the object of interest to obtain audio sample." The user can then input an audio sample.

Once the additional recommended viewpoints and/or additional information about the object are identified by the system, a request for these additional recommended viewpoints and/or additional information is transmitted to the device at 704. The user is then asked to capture additional images from particular angles or locations using the capture device. In some examples, the user may be asked to move the object relative to the camera. Additionally, in some implementations, the user can be notified when a distinct viewing angle is detected while the user is recording images on the device. Specifically, once the user is instructed about how to capture the additional images, the device can provide a notification when the additional images have been captured successfully.

Next, the system receives the additional viewpoints and/or additional information about the object from the device at 706. In some instances, the data received may include viewpoints and/or information that was not requested by the system. This data can also be considered by the system to provide a revised set of search results. However, the data received preferably includes at least one additional recommended viewpoint or additional information about the object, according to various embodiments.

In response to receiving the additional viewpoints and/or additional information about the object, the system obtains a revised set of search results at 708 based on the first set of viewpoints and any additional viewpoints, additional information, or other data provided by the device. These revised search results can be obtained in various ways. In one example, the additional images, information and/or other data provided can be compared to the previous set of search results to determine which of these search results still qualify as matches based on the additional images, information, and/or other data provided. In another example, the first set of viewpoints and any additional viewpoints, information, and/or other data are compared to stored images. In yet another example, a revised surround view or 3D model can be compared to the stored images. For instance, specific images from the surround view or 3D model of the object can be compared to the stored images. As previously described, comparing the images can include aspects such as considering the shape, appearance, texture, context, and/or distinctive views of the object. In addition, aspects such as information about the object can also be used such as brand, model, type of object, etc. Of course any of the criteria described for comparison can be used in conjunction with each other. Any matches found based on the first set of viewpoints along with any additional viewpoints, information, and/or other data are then included as a revised set of search results.

Figure 8:
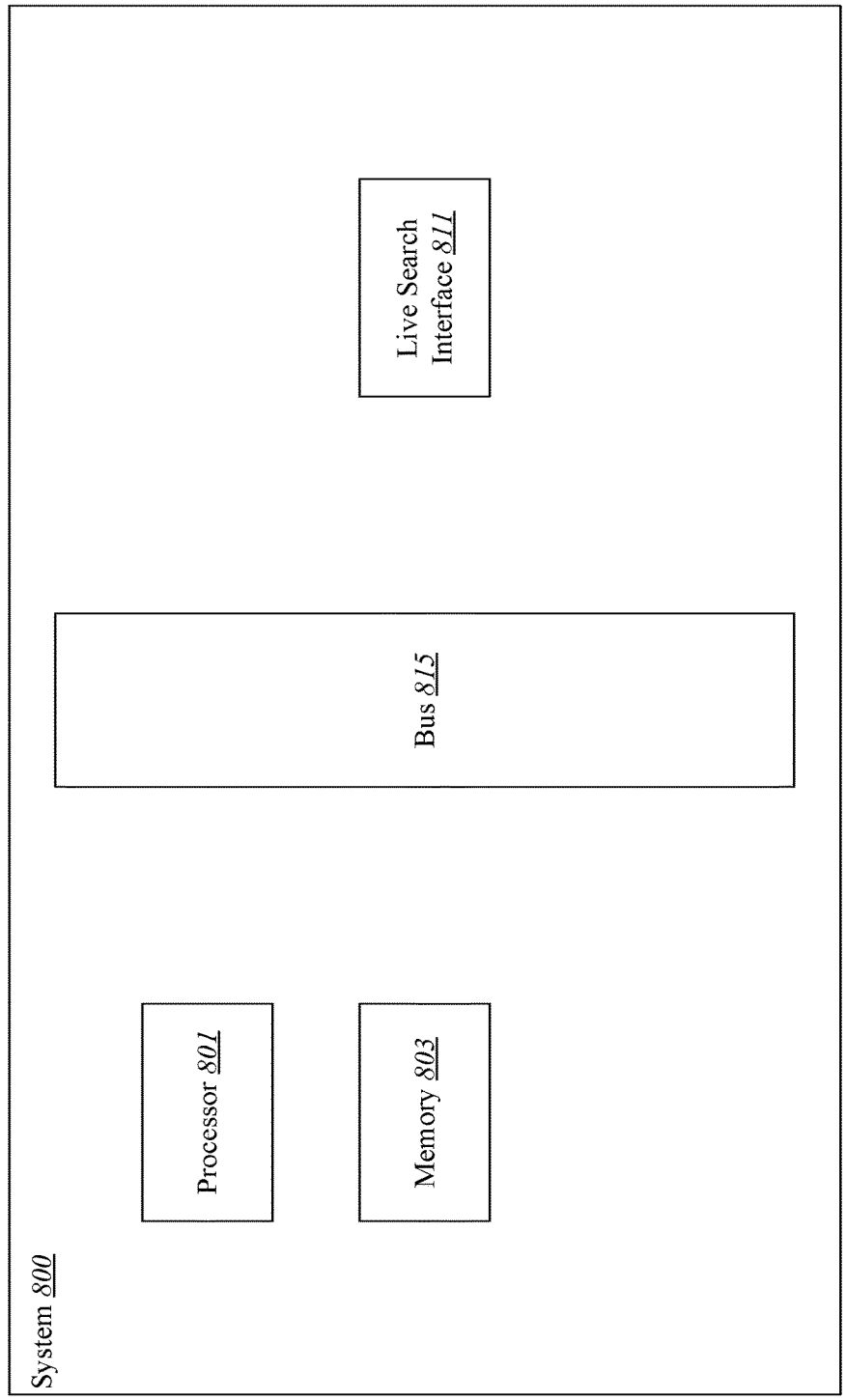
FIG. 8 illustrates a particular example of a computer system that can be used with various embodiments of the present invention.

With reference to FIG. 8, shown is a particular example of a computer system that can be used to implement particular examples of the present invention. For instance, the computer system 800 can be used to perform a live search using multi-view digital media representations according to various embodiments described above. According to particular example embodiments, a system 800 suitable for implementing particular embodiments of the present invention includes a processor 801, a memory 803, live search interface 811, and a bus 815 (e.g., a PCI bus). The live search interface 811 may include separate input and output interfaces, or may be a unified interface supporting both operations. When acting under the control of appropriate software or firmware, the processor 801 is responsible for such tasks such as optimization. Various specially configured devices can also be used in place of a processor 801 or in addition to processor 801. The complete implementation can also be done in custom hardware. The live search interface 811 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

What is claimed is:

1. A method comprising:
   receiving a visual search query from a device for an object to be searched;
   receiving a first multi-view interactive digital media representation of the object, the first multi-view interactive digital media representation being a first plurality of viewpoints of the object obtained during a live capture session of the object, the first multi-view interactive digital media representation capable of being displayed as a 3D representation on the device;
   identifying recommended viewpoints of the object for the device to capture, wherein the recommended viewpoints are chosen to provide more information about the object;
   transmitting a first set of search results and the recommended viewpoints of the object, wherein the first set of search results include one or more matches for the object based on the first multi-view interactive digital media representation;
   receiving a second multi-view interactive digital media representation, the second multi-view interactive digital media representation being a second plurality of viewpoints of the object wherein the second plurality of viewpoints of the object include at least one of the recommended viewpoints and at least one viewpoint from the first plurality of viewpoints; and
   transmitting a second set of search results to the device, wherein the second set of search results include one or more enhanced matches for the object based on the first multi-view interactive digital media representation and the second multi-view interactive digital media representation.

2. The method of claim 1, wherein the recommended viewpoints are identified by indicating a direction in which the device should be moved.

3. The method of claim 1, further comprising transmitting a first confidence value along with the first set of search results, wherein the first confidence value indicates an estimation of how closely the first set of search results matches the object to be searched.

4. The method of claim 1, further comprising transmitting a second confidence value along with the second set of search results, wherein the second confidence value indicates an estimation of how closely the second set of search results matches the object to be searched.

5. The method of claim 1, wherein the visual search query includes inertial measurement unit (IMU) data obtained when capturing the first surround view.

6. The method of claim 1, wherein additional sets of search results are provided in an iterative process based on recommended viewpoints and additional viewpoints provided by the device, wherein each additional set of search results includes increasingly enhanced matches for the object.

7. The method of claim 1, further comprising:
   identifying additional information about the object that would be useful for providing more relevant search results; and
   transmitting a request for the additional information to be provided to further enhance the search results.

8. The method of claim 7, wherein the additional information includes a visual, oral, or textual question.

9. The method of claim 7, wherein the additional information includes input at the device that provides more specific data about the object, wherein the input includes touch screen input, an audio sample input, or the like, and wherein the additional information is used for better selection and segmentation of the object.

10. The method of claim 1, wherein the first plurality of viewpoints and the second plurality of viewpoints are associated with the live capture session, wherein the live capture session includes images captured in real-time by a live camera.

11. A system comprising:
    a live search interface configured to receive a first and second multi-view interactive digital media representations of an object to a device, wherein the first multi-view interactive digital media representation being a first plurality of viewpoints of the object, wherein the first multi-view interactive digital media representation capable of being displayed as a 3D representation on the device wherein the first and second multi-view interactive digital media representations are obtained in real-time using image capture capabilities of the device during a live capture session, wherein the second multi-view interactive digital media representation includes at least one recommended viewpoint suggested by a live search front end server and at least one viewpoint from the first plurality of viewpoints, wherein the live search interface is further configured to transmit a first set of search results that includes one or more matches for the object based on the first multi-view interactive digital media representation and a second set of search results based on the first multi-view interactive digital media representation and the second multi-view interactive digital media representation; and the live search front end server configured to identify the recommended viewpoints of the object for the device to capture, wherein the recommended viewpoints are chosen based on first multi-view interactive digital media representation, wherein the recommended viewpoints improve the accuracy of the second set of search results in comparison to the first set of search results.

12. The system of claim 11, wherein the live search front end server is further configured to generate a first confidence value, wherein the first confidence value indicates an estimation of how closely the first set of search results matches the object to be searched.

13. The system of claim 11, wherein the live search front end server is further configured to identify additional information about the object that would be useful for providing more relevant search results, and wherein the live search interface is further configured to transmit a request for the additional information to be provided to further enhance the search results.

14. The system of claim 13, wherein the additional information includes a visual, oral, or textual question.

15. A computer readable medium comprising:
  computer code for receiving a visual search query from a device for an object to be searched;
  computer code for receiving a first multi-view interactive digital media representation of the object, the first multi-view interactive digital media representation being a first plurality of viewpoints of the object obtained during a live capture session of the object, the first multi-view interactive digital media representation capable of being displayed as a 3D representation on the device;
  computer code for identifying recommended viewpoints of the object for the device to capture, wherein the recommended viewpoints are chosen to provide more information about the object;
  computer code for transmitting a first set of search results and the recommended viewpoints of the object, wherein the first set of search results include one or more matches for the object based on the first multi-view interactive digital media representation;
  computer code for receiving a second multi-view interactive digital media representation, the second multi-view interactive digital media representation being a second plurality of viewpoints of the object, wherein the second plurality of viewpoints of the object include at least one of the recommended viewpoints and at least one viewpoint from the first plurality of viewpoints; and
  computer code for transmitting a second set of search results to the device, wherein the second set of search results include one or more enhanced matches for the object based on the first multi-view interactive digital media representation and the second multi-view interactive digital media representation.

16. The computer readable medium of claim 15, further comprising computer code for generating a first confidence value for the first set of search results and computer code for transmitting the first confidence value along with the first set of search results, wherein the first confidence value indicates an estimation of how closely the first set of search results matches the object to be searched.

17. The computer readable medium of claim 15, further comprising computer code for providing additional sets of search results in an iterative process based on recommended viewpoints identified by the server and additional viewpoints provided by the device, wherein each additional set of search results includes increasingly enhanced matches for the object.

18. The computer readable medium of claim 15, further comprising:
  computer code for identifying additional information about the object that would be useful for providing more relevant search results; and
  computer code for transmitting a request for the additional information to be provided to further enhance the search results.

19. The computer readable medium of claim 18, wherein the additional information includes a visual, oral, or textual question.

20. The computer readable medium of claim 18, wherein the additional information includes input at the device that provides more specific data about the object, wherein the input includes touch screen input, an audio sample input, or the like, and wherein the additional information is used for better selection and segmentation of the object.

* * * * *